Nov. 23, 1926.  
C. ANDERSON  
DRAFT EQUALIZER  
Filed June 4, 1925  
1,607,938
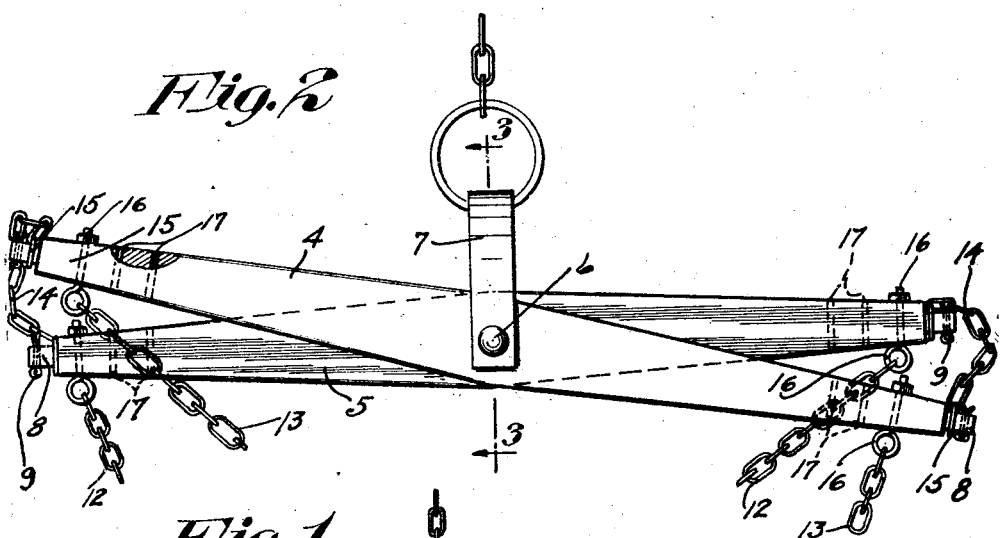
Fig. 2
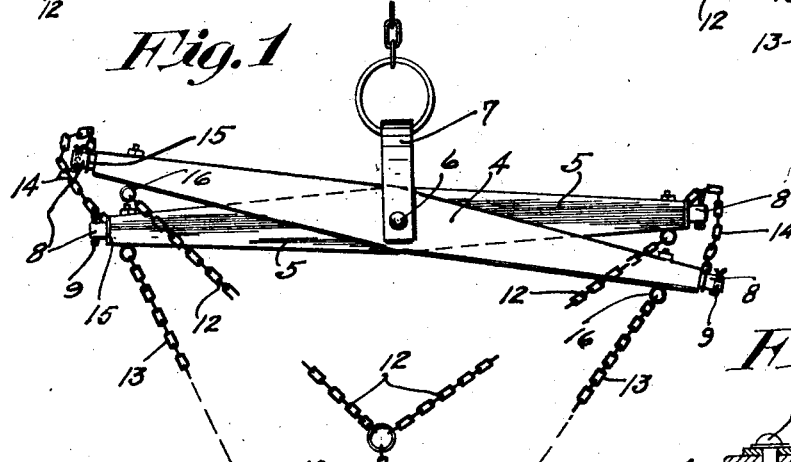
Fig. 1
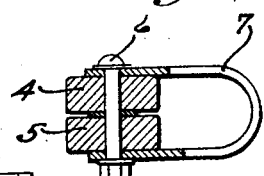
Fig. 3
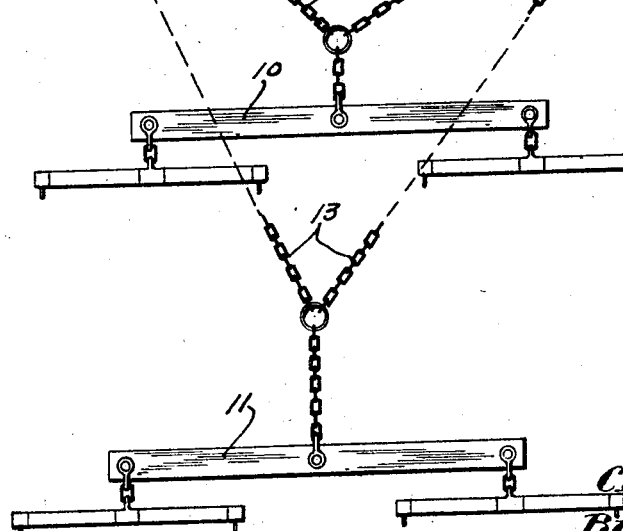
Inventor  
Clarence Anderson  
By his Attorneys  
Merchant and Kilson Patented Nov. 23, 1926.

1,607,938

UNITED STATES PATENT OFFICE.

CLARENCE ANDERSON, OF BAGLEY, MINNESOTA.

DRAFT EQUALIZER.

Application filed June 4, 1925. Serial No. 34,896.

My invention has for its object to provide an extremely simple and highly efficient draft equalizer, and to this end consists of the novel devices and combinations of devices hereinafter described and defined in the claim.

In the accompanying drawings, which illustrate the invention, like characters indicate like parts throughout the several views. Referring to the drawings:

Fig. 1 is a plan view of the invention, with some parts shown in different positions by means of broken lines;

Fig. 2 is a plan view of the draft beams turned out of alignment with each other; and Fig. 3 is a detail view principally in transverse section taken on the line 3—3 of Fig. 2.

The numeral 4 indicates an upper draft beam, and the numeral 5 indicates a lower draft beam and which draft beams, as shown, are of the same length and mounted on a common axis, to wit: the pivot pin 6 of a clevis 7 which may be attached to a plow or other implement, not shown. Trunnions 8 are formed on the ends of the draft beams 4 and 5 and have applied thereto cotter pins 9.

The numerals 10 and 11 indicate two doubletrees, the former of which is for a so-called pole team, and the latter of which is for a lead team. The doubletree 10 is provided with a pair of diverging draft chains 12 one of which is attached to one end of the draft beam 4 and the other of which is attached to the opposite end of the draft beam 5. A pair of diverging draft chains 13 are attached to the doubletree 11 and to the other ends of the two draft beams 4 and 5. It will thus be seen that the draft chains 12 and 13 are connected alternately to the ends of the draft beams 4 and 5.

The oscillatory movement of the draft beams 4 and 5, in respect to each other, is limited by a pair of stop chains 14 having on their ends collars or rings 15 applied to the trunnions 8 and held thereon by the cotter pins 9.

The draft chains 12 and 13 are attached to the draft beams 4 and 5 by nut-equipped eye-bolts 16. In the outer end portion of each draft beam 4 and 5 is a plurality of holes 17 extending transversely therethrough (as shown three) and longitudinally spaced in respect to said beam, and in any one of which the respective eye-bolt may be mounted to vary the leverage of the respective draft beam. Obviously, by adjusting the eye-bolts 16 the pulling powers of the two teams may be equalized.

By reference to Figs. 1 and 2 it will be noted that the trunnions 8 on the upper draft beam 4 are located a greater distance from the pivot 6 than the trunnions 8 on the lower draft beam 5 so as to prevent the stop chains 14 from getting in between the upper and lower trunnions 8 and thereby bend or lock the draft beams 4 and 5.

By adjusting the stop chains 14 to vary their operative length, the movement of the draft beams 4 and 5 in respect to each other may be varied at will.

What I claim is:

A draft equalizer comprising upper and lower draft beams mounted on a common axis, the former of which is longer than the latter, draft chains connected alternately to the ends of the two draft beams, and stop chains connecting adjacent ends of the draft beams to limit their oscillatory movement in respect to each other, the connections between the stop chains and the upper draft beam being outward of their connection with the lower draft beam, whereby the stop chains will swing by the ends of the lower draft beam during the oscillatory movements of the draft beams.

In testimony whereof I affix my signature.

CLARENCE ANDERSON.